(12) United States Patent
Küpper et al.

(10) Patent No.: US 6,464,441 B2
(45) Date of Patent: Oct. 15, 2002

(54) DOWEL PIN OF AN ASSEMBLY ARRANGEMENT FOR JOINING TWO FURNITURE PARTS

(75) Inventors: Gerd Küpper, Bad Salzuflen (DE); Hans-Jürgen Geschke, Berlin (DE); Manfred Brinkman, Hüllhorst (DE)

(73) Assignee: Hettich-Heinze GmbH & Co. KG, Spenge (DE)

( * ) Notice: Subject to any disclaimer, the term of this patent is extended or adjusted under 35 U.S.C. 154(b) by 0 days.

(21) Appl. No.: 09/903,745

(22) Filed: Jul. 13, 2001

(65) Prior Publication Data

US 2002/0006320 A1 Jan. 17, 2002

(30) Foreign Application Priority Data

Jul. 14, 2000 (DE) ..................................... 200 12 368 U (51) Int. Cl.$^7$ ................................................. F16B 35/02
(52) U.S. Cl. ........................................ 411/383; 411/396
(58) Field of Search ................................ 411/383, 384, 411/386, 397, 178, 346, 338, 339

(56) References Cited

U.S. PATENT DOCUMENTS

| 824,983 | A | * | 7/1906 | Farrington | 351/141 |
| 5,141,373 | A | * | 8/1992 | Kendall | 403/408.1 |
| 5,226,769 | A | * | 7/1993 | Negre et al. | 403/322.1 |
| 5,234,300 | A | * | 8/1993 | Fluckiger | 411/107 |
| 5,336,028 | A | * | 8/1994 | Yamamoto | 403/21 |
| 5,415,507 | A | * | 5/1995 | Janusz et al. | 411/383 |
| 5,569,008 | A | * | 10/1996 | Chapkovich | 411/383 |

FOREIGN PATENT DOCUMENTS

| DE | OE0095971 | * | 2/1924 | | 411/461 |
| DE | 3625789 A1 | * | 2/1988 | | F16B/21/00 |

* cited by examiner

Primary Examiner—Flemming Saether
Assistant Examiner—Jori Schiffman
(74) Attorney, Agent, or Firm—Barnes & Thornburg (57) ABSTRACT

A dowel pin of an assembly arrangement for joining two furniture parts. The dowel pin includes a fixing part with a recess into which a dowel shaft is fitted and is then fixed by the deformation and/or pressing-together of a jacket area of the fixing part surrounding the recess.

9 Claims, 7 Drawing Sheets

DOWEL PIN OF AN ASSEMBLY ARRANGEMENT FOR JOINING TWO FURNITURE PARTS

BACKGROUND AND SUMMARY OF THE INVENTION

The present invention relates generally to a dowel pin of an assembly for joining two furniture parts. The dowel pin has a fixing part for the fixing on a first furniture part and a dowel shaft which is connected with the fixing part and has a head part. In the mounted condition, the dowel shaft projects into a bore of a second furniture part with its head situated in the area of a cross bore of the second furniture part. A second fixing element of the assembly fitting reaches behind the head part.

In the construction of furniture, assembly arrangements of the above-mentioned type are required in the most varied designs. This applies particularly to the dowel pins but also to the second fixing element.

Since the present invention relates only to the dowel pin of a corresponding assembly arrangement, it is mentioned only in passing that the second fixing element can, for example, be a joining element with eccentric tension curves or a joining element equipped with elastically disposed detent devices.

The above-addressed required multiplicity applies particularly to the dowel pins themselves.

Thus, on the one hand, dowel pins are required in many different lengths. On the other hand, dowel pins are required which have differently designed fixing parts.

The head part of the dowel pin to be provided can also be demanded in different embodiments. Thus, head parts are known, for example, in tool engaging openings of many different designs, such as a screwdriver slot, a hexagon socket or the like.

The expenditures for the organization and storage of this multiplicity of different dowel pins are considerable in practice.

Upon special requests by users, special productions of smaller piece numbers are even required, which naturally results in relatively high costs.

The invention is based on the object of providing a dowel pin of the above-mentioned type which, in a simple manner and at reasonable cost, is assembled from a prefabricated fixing part and an also prefabricated dowel shaft to form a highly stressable dowel pin.

According to the invention, this object is achieved in that the fixing part has a recess in a jacket area into which recess the dowel shaft is inserted and is fixed by the deformation and/or pressing-together of the jacket-area of the fixing part surrounding the recess.

From a large and therefore cost-effectively producible standard program of many different fixing parts and many different dowel shafts, the dowel pins required for a concrete application case can be assembled as required in a largely automated and therefore cost-effective production process. In this case, it is particularly advantageous that the joining of the fixing part and the dowel shaft can take place by cold forming.

A particularly intimate and firm connection between the fixing part and the dowel shaft, is promoted in that the recess in the interior of the jacket area of the fixing part surrounding the dowel shaft is provided with a fluting.

If a dowel pin according to the invention is required on which particularly high demands are made with respect to the resistance to twisting between the fixing part, and the dowel shaft, it is provided according to another embodiment of the invention that, at least on its end projecting into the recess, the dowel shaft, like the recess itself, is provided with a non-circular cross-section.

Other objects, advantages and novel features of the present invention will become apparent from the following detailed description of the invention when considered in conjunction with the accompanying drawings.

DETAILED DESCRIPTION OF THE PREFERRED EMBODIMENTS

FIGS. 1a to 1d show in a table form that dowel pins of an assembly arrangement for joining two furniture parts according to the present invention can be produced to be assembled from at least one fixing part and at least one dowel shaft in various configurations.

In this case, FIGS. 1a to 1d illustrate in the left-hand columns in each case a possible embodiment of a fixing part and, in the upper rows, in each case the possible shape of a dowel shaft and a center sleeve. The other fields of the table-type illustration show the respectively possible combination.

This table-type overview only has the purpose of demonstrating that a very large multiplicity of various dowel pins may be required for many. different applications and, according to the present invention, which will be described in greater detail, can be produced from different components in a cost-effective and rapid manner.

Figure 1A:
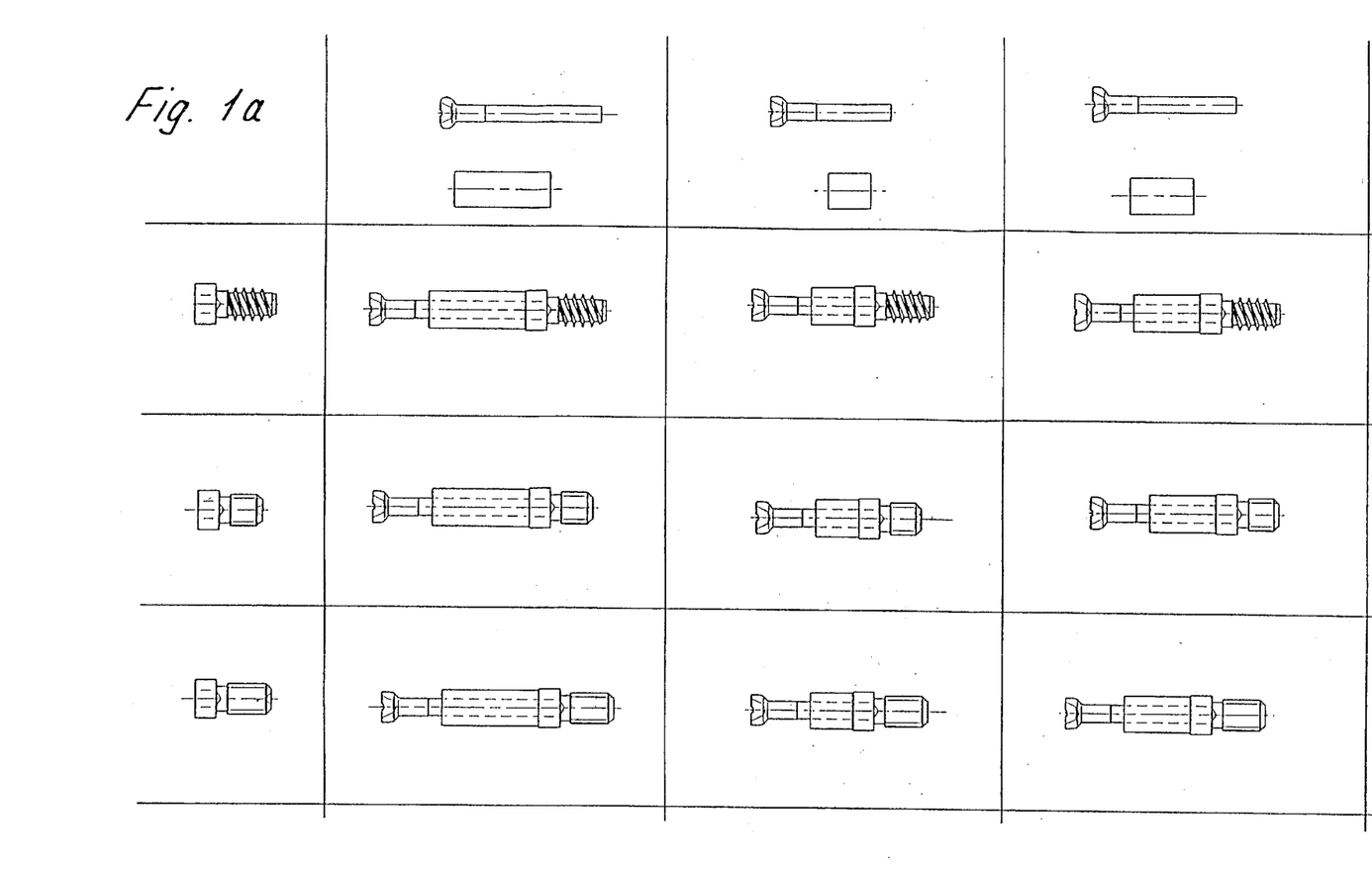
FIGS. 1a to 1d are table-type overviews of different combination possibilities of dowel pins produced from component parts according to the principles of the present invention.
Figure 1B:
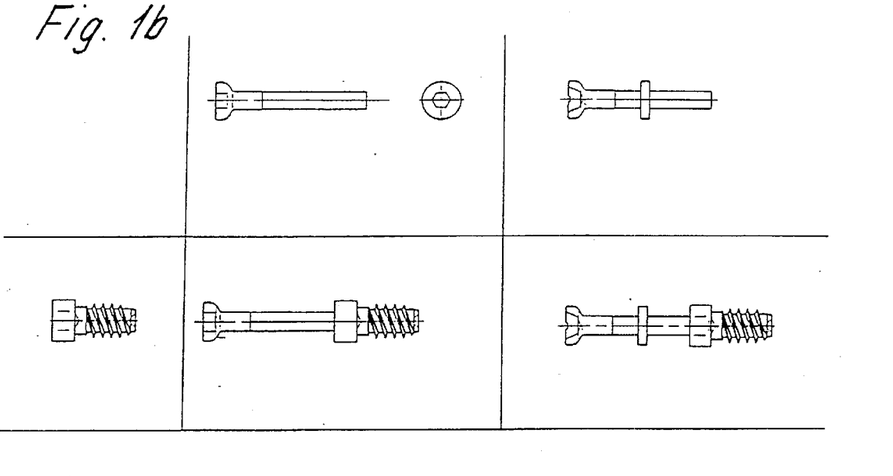
Figure 1C:
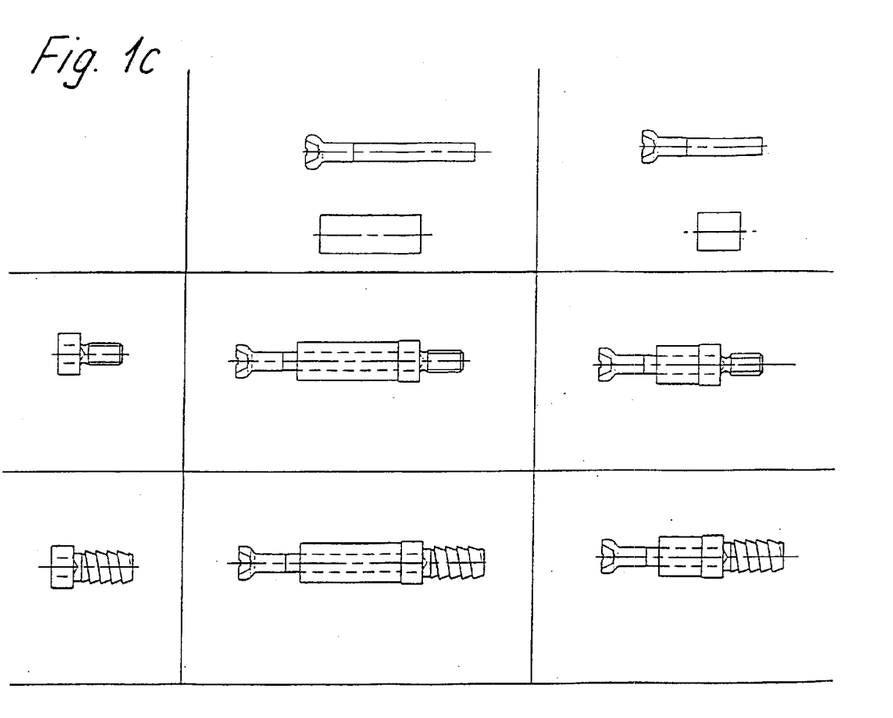
Figure 1D:
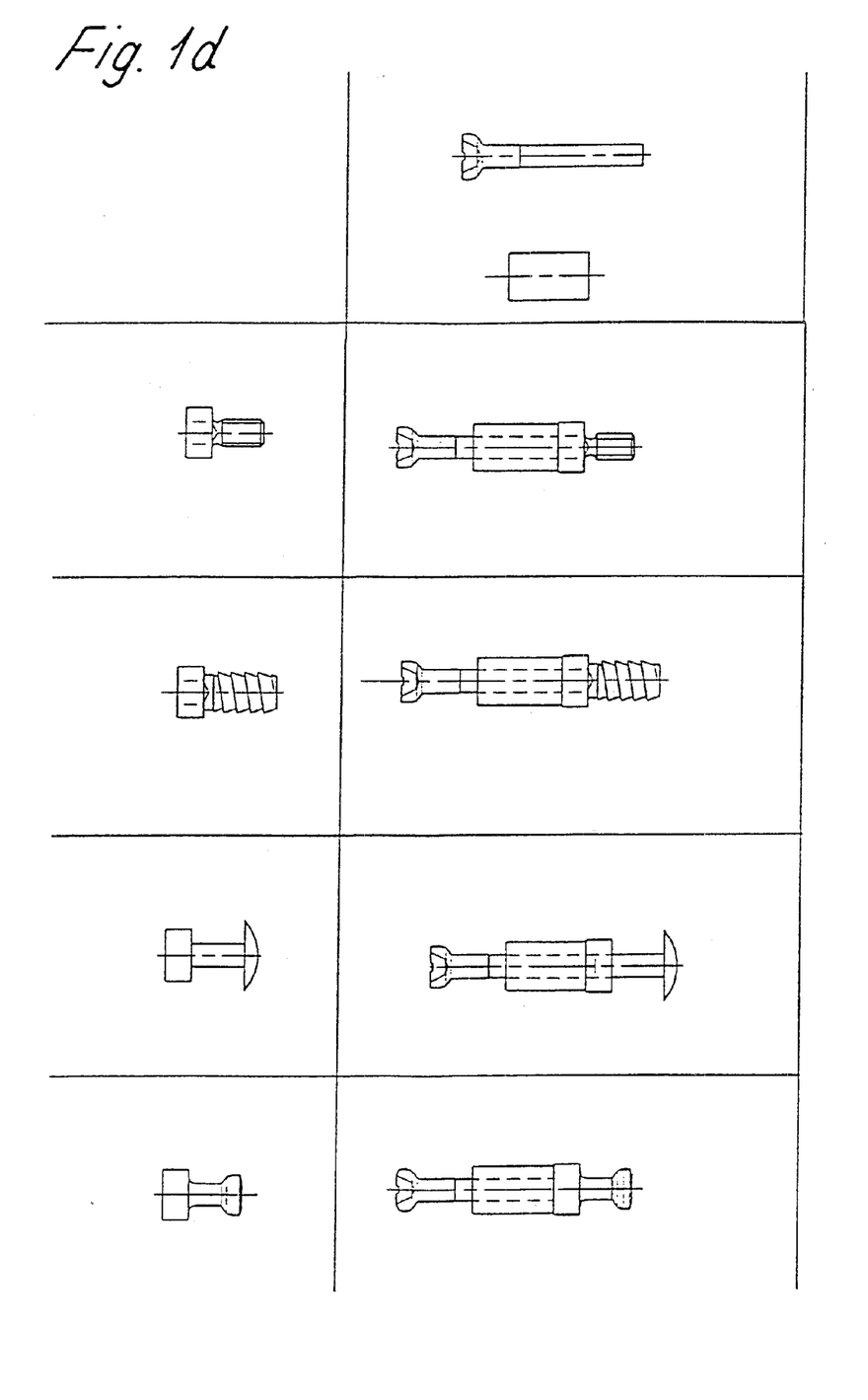
Figure 2:
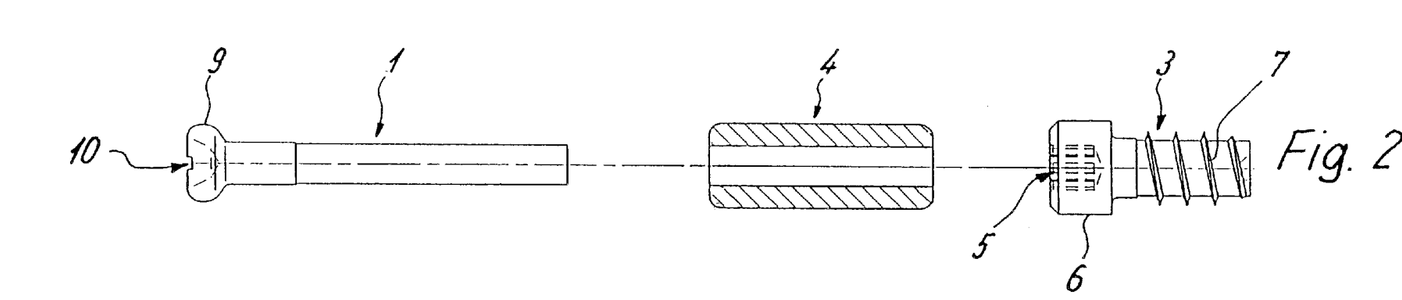
FIG. 2 is a view of component parts of a dowel pin according to the invention before the final mounting of the dowel pin.

In FIG. 2, reference number 1 indicates a dowel shaft of a dowel pin (see FIG. 4); reference number 3 indicates a fixing part of the dowel pin 2; and reference number 4 indicates a centering sleeve which is pushed onto the dowel shaft 1 before the assembly of the dowel shaft 1 and the fixing part 3.

On its face-side end facing the dowel shaft 1, the fixing part 3 is provided with a recess 5 into which the dowel shaft 1 is introduced. Subsequently, a jacket area 6 of the fixing part 3, which surrounds the recess 5, is deformed and/or pressed together so that-the dowel shaft 1 is fixed in the above-mentioned recess 5 at least in a force-locking manner.

Figure 4:
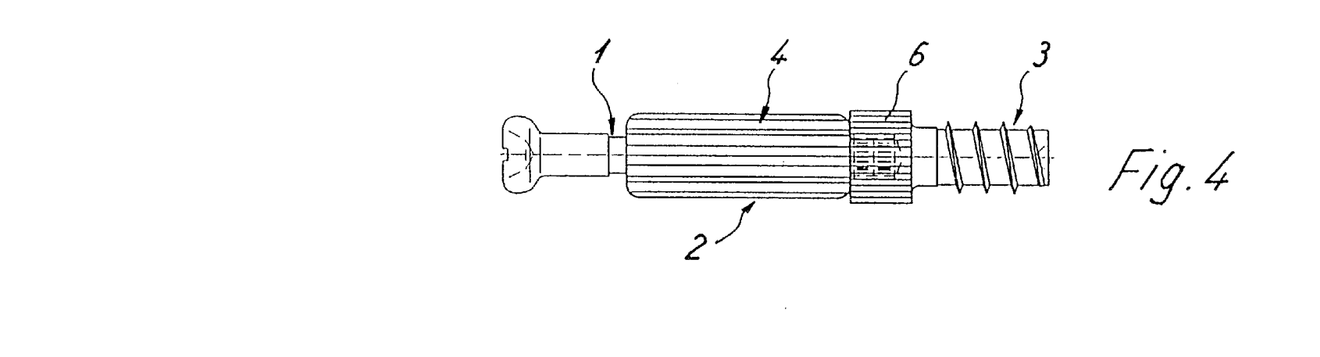
FIG. 4 is a view of the dowel pin produced from the component parts according to FIG. 2.
Figure 5:
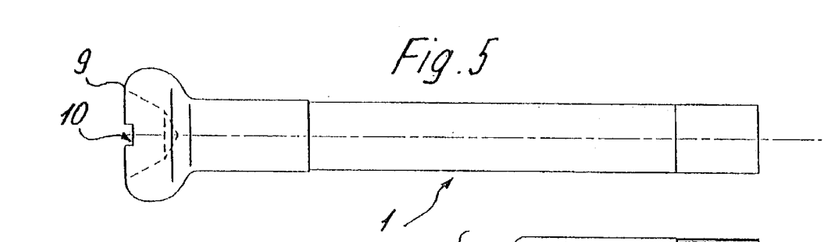
FIG. 5 is a view of a dowel shaft for a dowel pin according to the invention.
Figure 6:
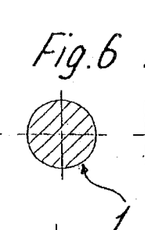
FIGS. 6, 7, 8 are sectional views of different cross-sectional shapes of the dowel pin according to FIG. 5.

The finished dowel pin 2 according to FIG. 4 therefore consists of the dowel shaft 1, which is connected with the fixing part 3, so that it cannot be separated or lost, and of the centering sleeve 4 arranged on the dowel shaft 1.

Referring back to the table-type representation of different combination possibilities according to FIGS. 1a to 1d, the basic idea of the present invention is now revealed. Specifically, large quantities of fixing parts 3 of different constructions, which can therefore be produced at an extremely reasonable price, can easily and without any problem be joined with equally large quantities of differently conceived dowel shafts 1 which can also be produced at a reasonable price. Thus, dowel pins 2 are therefore provided for all conceivable applications.

The embodiment according to FIG. 2 illustrates a fixing part 3 which is equipped with a self-cutting thread or a thread for woodwork 7. In contrast, in the embodiment according to FIG. 3, a fixing part 3 is provided which is equipped with a thread 8 which can be screwed into a (not shown) threaded bush which is sunk into a furniture part.

Figure 3:
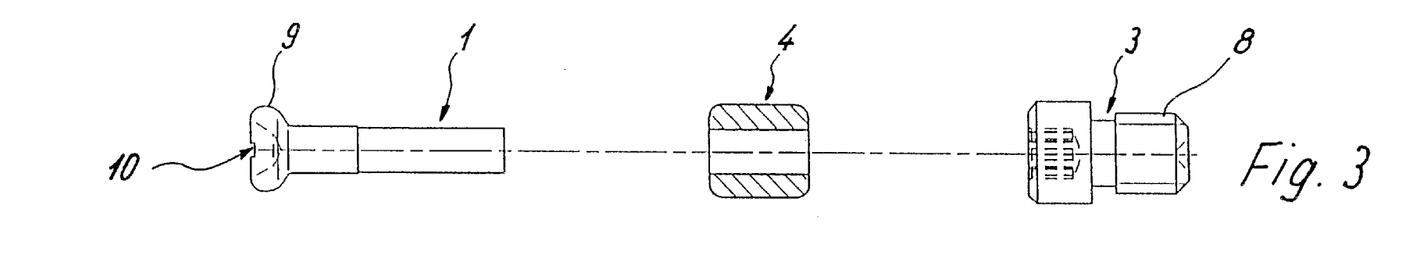
FIG. 3 is a representation corresponding to FIG. 2 of another embodiment of the invention.

In the embodiment according to FIGS. 2 and 3, the lengths of the dowel shafts 1 are also selected to be different.

The same applies to the lengths of the centering sleeve 4 pushed onto the respective dowel shaft 1.

The dowel shaft 1, equipped in each case with a head part 9, can be provided in the area of its head part 9 with different tool engaging openings 10, for example, in the form of a screwdriver slot, a hexagon socket or the like.

The respective centering sleeve 4, which is advantageously made of a plastic material, corresponds with respect to its outside diameter to the inside diameter of a bore in a second furniture part, into which the dowel shaft 1 projects. In this case, the centering sleeve 4 is used for centering the longitudinal axis of the dowel shaft 1 inside the above-mentioned bore and also used for supporting the dowel shaft with respect to the interior wall of the above-mentioned bore in the event of transverse loads.

FIGS. 5 to 8 illustrate that the cross-section of a dowel shaft 1 can be circular as well as polygonal.

Figure 7:
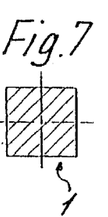
Figure 8:
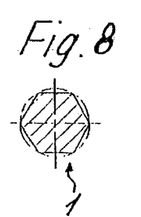

If a corresponding centering sleeve 4 is pushed onto a dowel shaft 1 with the circular cross-section, the centering sleeve 4 can be rotated with respect to the dowel shaft 1. This is advantageous in some applications. In contrast, if a rotation of the centering sleeve 4 on the dowel shaft 1 is to be avoided, the selection of polygonal cross-sections according to FIGS. 7 and 8 is advantageous.

Figure 9:
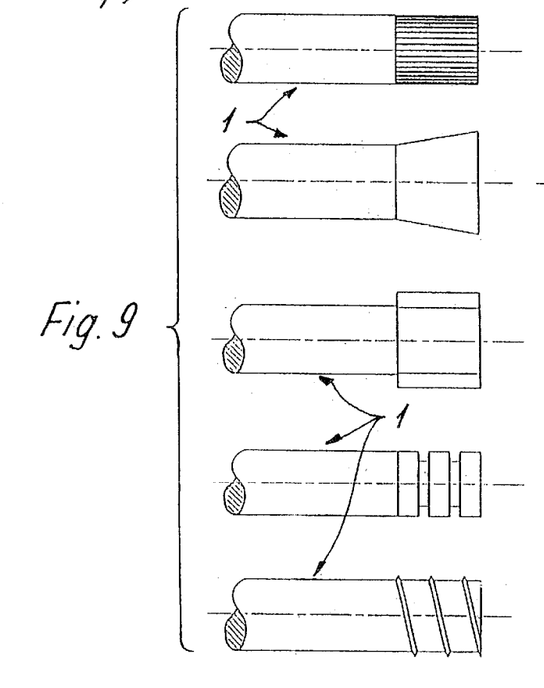
FIG. 9 shows partial views of face-side ends of dowel shafts of different constructions.
Figures 10A, 10B:
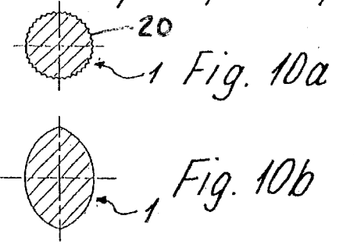
FIGS. 10a to 10d are cross-sectional views of the face-side ends of the dowel shafts each arranged in FIG. 9 in the same plane.
Figure 10C:
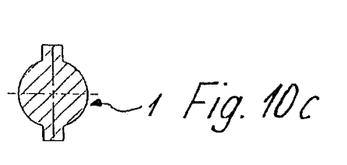
Figure 10D:
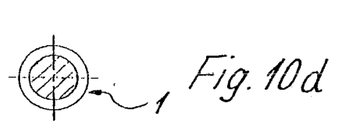

FIGS. 9 as well as 10a to 10d indicate that a dowel shaft 1, in its face-side end area, which engages in a recess 5 of a fixing part 3, can have various configurations for improving the holding forces after the deforming and/or pressing-together of the jacket area 6 of the fixing part 3. These can be, for example, a fluting 20 (FIG. 10a) a conically expanded, non-circular end (FIG. 10b), radially projecting web sections (FIG. 10c), transverse grooves (FIG. 10d) or thread-type webs (FIG. 9, bottom representation).

Figure 11:
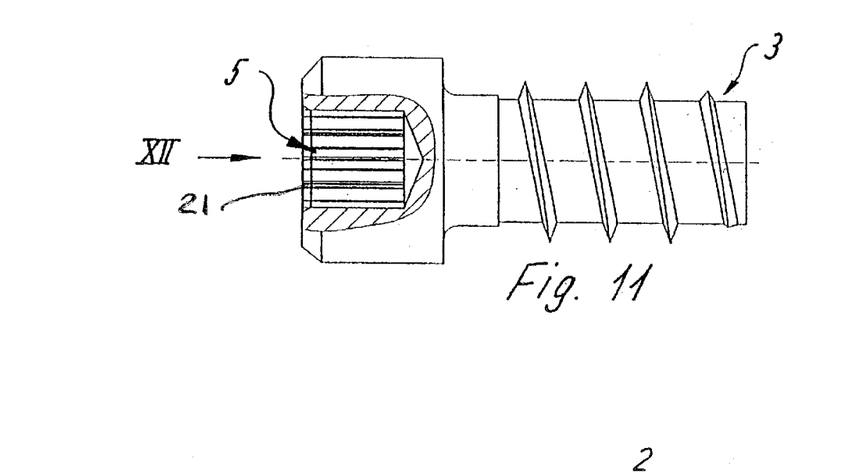
FIG. 11 is a partially sectional view of a fixing part of a dowel pin according to the invention.
Figure 12:
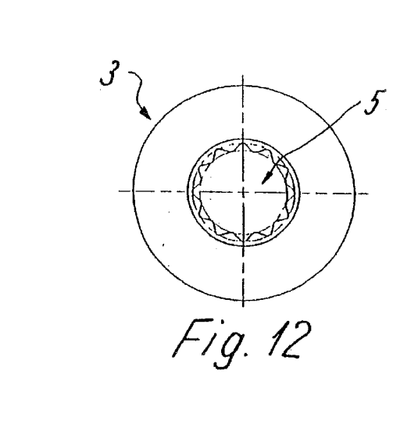
FIG. 12 is a view in the direction of the arrow XII in FIG. 11.

An improvement of the connection between the dowel shaft 1 and the fixing part 3 can, for example, also take place in that the recess 5 of the fixing part 3 can be provided with a fluting 21 as shown in FIGS. 11 and 12.

Figure 13:
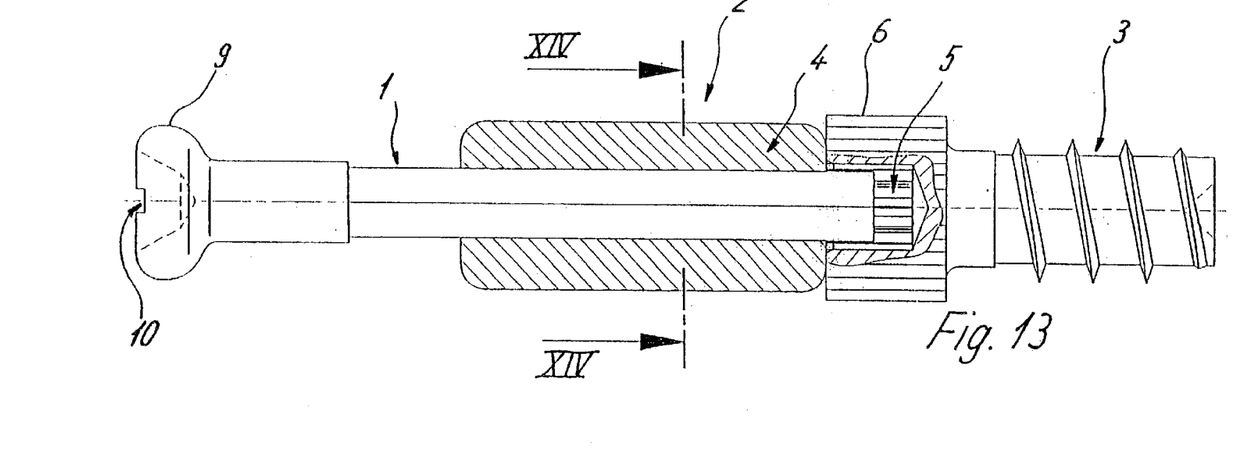
FIG. 13 is a partially longitudinal sectional view of the dowel pin according to the present invention.
Figure 14:
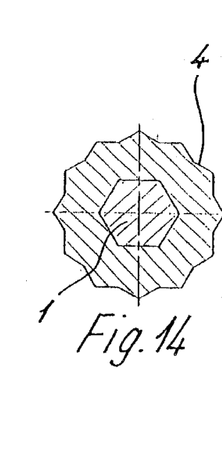
FIG. 14 is a sectional view according to Line XIV in FIG. 13.

FIG. 13 shows a dowel pin 2 which is equipped with fixing part 3 fluted in the area of the receiving opening 5.

Figure 15:
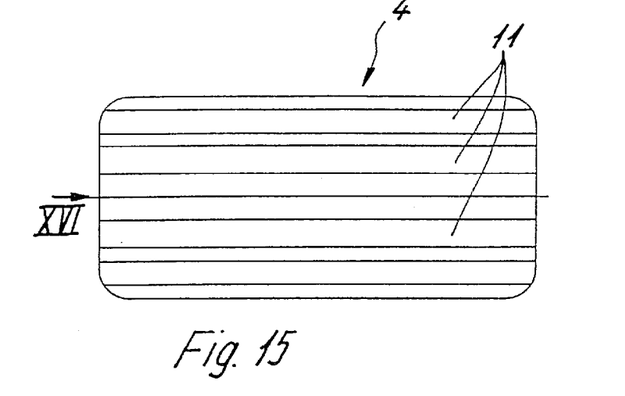
FIG. 15 is a view of a centering sleeve which can be pushed onto a dowel shaft of a dowel pin according to the invention.
Figure 16:
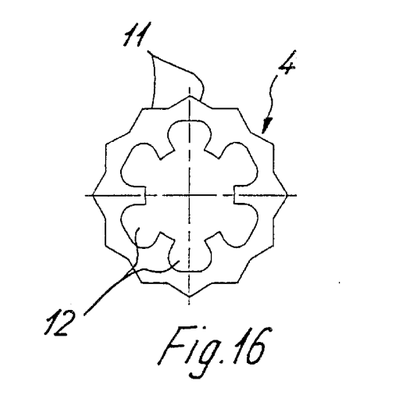
FIG. 16 is a view in the direction of the arrow XVI in FIG. 15.
Figure 17:
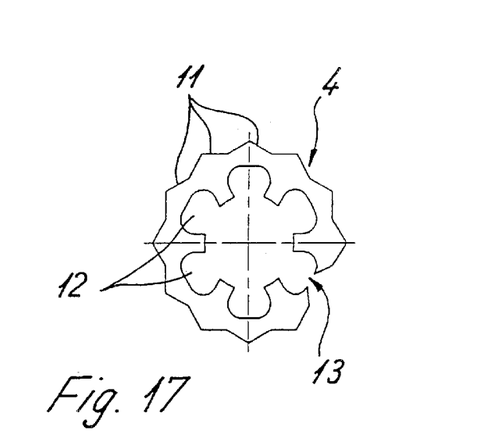
FIG. 17 is a view of a centering sleeve corresponding to FIG. 16 according to another embodiment of the invention.

FIGS. 15 to 17 show possible embodiments of centering sleeves 4.

The above-mentioned FIGS. 15 to 17 demonstrate that, particularly for saving material, such centering sleeves 4 can be provided with longitudinal grooves 11 and 12 on the exterior side as well as on the interior side.

Furthermore, FIG. 17 shows that a centering sleeve 4 can be opened in the axial direction by a longitudinal slot 13. The slotted centering sleeve 4 can be snapped onto a dowel shaft 1 after the assembly of the dowel shaft 1 and the fastening part 3, or to taken off the dowel shaft 1.

Further, a longitudinally slotted centering sleeve 4 illustrated in FIG. 17 can also allow a certain tolerance compensation with respect to the bore in which the dowel shaft 1 is inserted.

Thus, from a construction kit system of many different fixing parts 3 and many different dowel shafts 1 as well as many different centering sleeves 4, a dowel pin 2 can be produced in a simple manner at extremely reasonable cost for virtually any conceivable application.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A dowel pin of an assembly for joining two furniture parts, the dowel pin comprising:

a fixing part for the fixing on a first furniture part;

a dowel shaft for projecting into a bore of a second furniture part;

a head part of the dowel for cooperating with a second fixing element of the assembly; and an end portion of the dowel shaft extending into a recess in a jacket area of the fixing part and secured by deformation or pressing-together of the jacket area of the fixing part and wherein the recess includes fluting in the interior of the jacket area surrounding the dowel shaft.

2. A dowel pin according to claim 1, wherein the end portion of the dowel shaft is provided with one of (a) a fluting, (b) conically expanded, non-circular cross-section, (c) radially projecting web sections, and (d) transverse grooves or with webs extending around in a spiral manner.

3. A dowel pin of an assembly for joining two furniture parts, the dowel pin comprising:

a fixing part for the fixing on a first furniture part;

a dowel shaft for projecting into a bore of a second furniture part;

a centering sleeve adapted to be axially pushed onto the dowel shaft before the joining of the dowel shaft and the fixing part and arranged on the dowel shaft for projecting into a bore of a second furniture part;

a head part of the dowel for cooperating with a second fixing element of the assembly; and an end portion of the dowel shaft extending into a recess in a jacket area of the fixing part and secured to form a tight fit by deformation or pressing-together of the jacket area of the fixing part.

4. A dowel pin according to claim 3, wherein the centering sleeve is made of a plastic material.

5. A dowel pin according to claim 3, wherein the end portion of the dowel shaft is provided with one of (a) a fluting, (b) conically expanded, non-circular cross-section, (c) radially projecting web sections, and (d) transverse grooves or with webs or the like extending around in a thread-type manner.

6. A dowel pin according to claim 3, wherein the dowel shaft has a circular cross-section.

7. A dowel pin according to claim 3, wherein the dowel shaft has a non-circular or polygonal cross-section.

8. A dowel pin of an assembly for joining two furniture parts, the dowel pin comprising:

a fixing part for the fixing on a first furniture part;

a dowel shaft for projecting into a bore of a second furniture part;

a centering sleeve slotted in the longitudinal direction snapped onto a dowel shaft and arranged on the dowel shaft for projecting into a bore of a second furniture part;

a head part of the dowel for cooperating with a second fixing element of the assembly; and an end portion of the dowel shaft extending into a recess in a jacket area of the fixing part and secured to form a tight fit by deformation or pressing-together of the jacket area of the fixing part.

9. A dowel pin of an assembly for joining two furniture parts, the dowel pin comprising:

a fixing part for the fixing on a first furniture part;

a dowel shaft for projecting into a bore of a second furniture part;

a centering sleeve with longitudinal grooves on one or more of the exterior side and the interior side and arranged on the dowel shaft for projecting into a bore of a second furniture part;

a head part of the dowel for cooperating with a second fixing element of the assembly; and an end portion of the dowel shaft extending into a recess in a jacket area of the fixing part and secured by deformation or pressing-together of the jacket area of the fixing part.

* * * * *